Feb. 27, 1962     I. W. COX     3,023,348
MOTOR CONTROL SYSTEM
Filed May 29, 1959
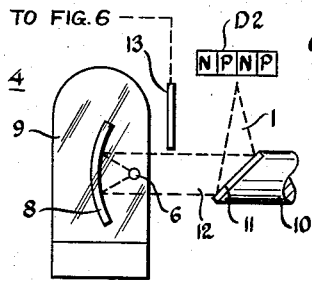
Fig. 3
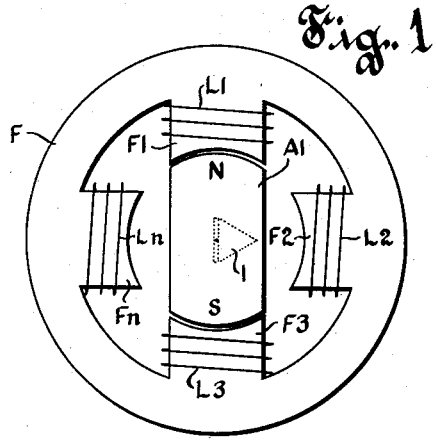
Fig. 1
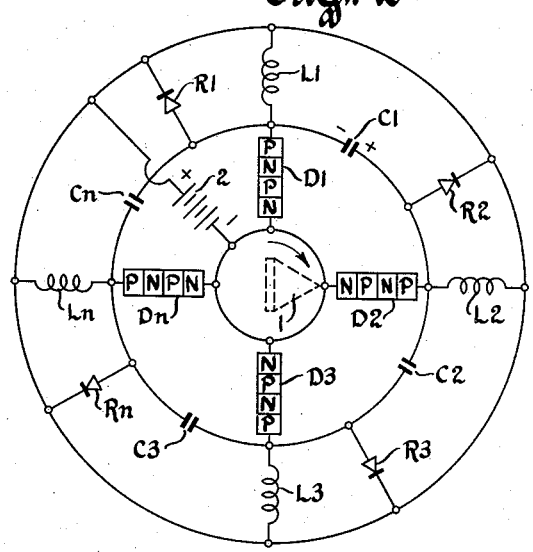
Fig. 2
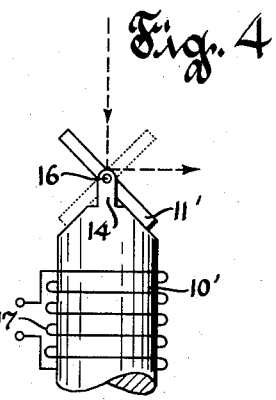
Fig. 4
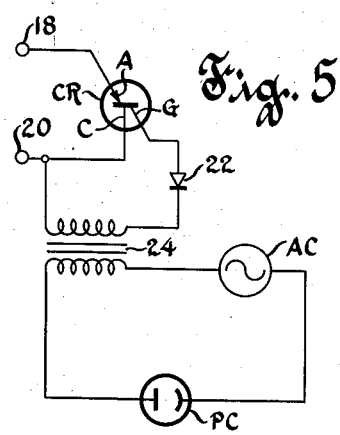
Fig. 5
Fig. 6
Inventor
Irvin W. Cox
By Wm. A. Autio
Attorney

United States Patent Office 3,023,348
Patented Feb. 27, 1962

3,023,348
MOTOR CONTROL SYSTEM
Irvin W. Cox, West Allis, Wis., assignor to Cutler-Hammer, Inc., Milwaukee, Wis., a corporation of Delaware
Filed May 29, 1959, Ser. No. 816,979
14 Claims. (Cl. 318—138)

This invention relates to motor control systems and more particularly to static-type commutators for a direct current motor having a permanent magnet rotor.

A general object of the invention is to provide an improved commutator control system for a direct current motor.

A more specific object of the invention is to provide a novel radiant energy controlled commutator for a direct current motor.

Another specific object of the invention is to provide an improved static type commutator for a direct current motor employing semi-conductor devices.

Another object of the invention is to provide an improved commutator for controlling running and reversing of a direct current motor.

Another object of the invention is to provide an improved motor control system for controlling rotation of the motor in predetermined angular amounts in a selected direction.

Other objects and advantages of the invention will hereinafter appear.

While the apparatus hereinafter described is effectively adapted to fulfill the objects stated, it is to be understood that I do not intend to confine my invention to the particular preferred embodiments of motor control systems described inasmuch as they are susceptible of various modifications without departing from the scope of the appended claims.

Preferred embodiments of the invention will now be described in detail with reference to the accompanying drawings wherein:

FIGURE 1 schematically shows a direct current motor having a permanent magnet rotor;

FIG. 2 diagrammatically shows a static type commutator control system for the motor of FIG. 1;

FIG. 3 diagrammatically shows radiant energy control apparatus employed for controlling the system of FIG. 2;

FIG. 4 schematically shows reversing apparatus for the control system of FIGS. 2 and 3;

FIG. 5 diagrammatically shows a modified control circuit which may be employed in the system of FIGS. 2 and 3; and FIG. 6 is a fragmentary diagram showing another modification of the system of FIGS. 2 and 3.

Referring to FIG. 1 there is shown a direct current motor having a stationary field structure or stator F and a permanent magnet rotor A1. Field structure F is provided with a plurality of magnetic poles, F1, F2, F3 and F$n$ having windings L1, L2, L3 and L$n$ wound therearound, respectively. Rotor A1 is of the permanent magnet type as indicated by the N—S at the opposite ends thereof and is mounted on a rotary shaft. The dotted triangle shown at the center of rotor A is representative of a reflected light beam 1 for commutating the motor as hereinafter more fully described.

The system shown in FIG. 2 for controlling the field windings of the motor of FIG. 1 is provided with a source of direct current energy such as a storage battery 2. Field windings L1, L2, L3 and L$n$ are connected in parallel across battery 2 each having in series therewith a light sensitive semi-conductor diode or gating device of the PNPN type or the like. Thus, field winding L1 is connected in series with semi-conductor device D1 across battery 2. Field winding L2 is connected in series with semi-conductor device D2 across battery 2. Field winding L3 is connected in series with semi-conductor device D3 across battery 2, and field winding L$n$ is connected in series with semi-conductor device D$n$ across battery 2. In each such parallel circuit the field winding is connected to the positive side of battery 2 and the semi-conductor device is connected to the negative side of the battery. The unidirectional conducting devices such as rectifiers R1, R2, R3 and R$n$ are connected across field windings L1, L2, L3 and L$n$, respectively. These rectifiers are connected in a direction to block current flow therethrough from battery 2 but to serve to discharge each field winding when the next field winding is energized. The junction of field winding L1 and semi-conductor device D1 is connected through a capacitor C1 to the junction of field winding L2 and semi-conductor device D2. The latter junction is connected through a capacitor C2 to the junction of field winding L3 and semi-conductor device D3. The latter junction is connected through a capacitor C3 to the junction of field winding L$n$ and semi-conductor device D$n$ and the latter junction is connected through a capacitor C$n$ to the junction of field winding L1 and semi-conductor device D1.

Referring to FIG. 3 there is shown a lamp 4 such as a sealed-beam lamp or the like having a light source 6 and a parabolic reflector 8 enclosed in a transparent enclosure 9. FIG. 3 shows a portion of the round shaft of the motor of FIG. 1 and one of the semi-conductor devices D2 shown in FIG. 2. The end of shaft 10 is provided with a polished surface at an angle of 45 degrees or the like to form a reflector 11 for receiving the light beam 12 from lamp 4 and reflecting the same onto semi-conductor device D2 as indicated by 1. A shutter 13 is arranged for vertical movement to block the light beam as hereinafter described in connection with FIG. 6.

Referring to FIG. 4, there is shown a modification of the reflector structure of FIG. 3 affording reversal of the direction of operation of the motor. Motor shaft 10' has pivotally mounted thereon a reflector 11' of magnetic material. To this end, shaft 10' is provided at an end portion thereof with a pair of spaced projections 14. A pin 16 extends through alined apertures in these projections and through reflector 11' to pivot the latter on the shaft. Thus, when reflector 11' is pivoted to its extreme clockwise position, the light beam originating axially of the shaft is reflected to the right and when reflector 11' is pivoted to its extreme counterclockwise position, the light beam is reflected to the left. A stationary coil 17 is supported to encircle shaft 10'. Application of a unidirectional electrical pulse through coil 17 causes the magnetic mirror or reflector 11' to flip from one position to another to reverse the motor. Shaft 10' is preferably provided with two surfaces converging toward pivot pin 16, each such surface being at an angle of 45 degrees or the like to the axis of the shaft to serve as stops for reflector 12'.

Magnetic reflector 11' may be caused to flip from one position to another by the well known magnetic repulsion effect of like poles. For example, if the magnetic reflector is provided with a magnetic north pole at its left-hand end and a magnetic south pole at its right-hand end, an electrical pulse having a polarity such as to afford a magnetic south pole at the upper end of shaft 10' applied to winding 17 causes reflector 11' to be repulsed to rotate in the counterclockwise direction. At the end of such pulse, the left-hand end of the reflector will be attracted to the shaft to complete the pivoting of the reflecor. Application of a pulse of opposite polarity to winding 17 will cause the reflector to pivot back. A preferred arrangement is to provide like magnetic poles, for example south poles, at the ends of reflector 11' and the opposite magnetic pole at the center thereof in a well known manner.

Under this condition, application of a pulse to winding 17 having a polarity such as to afford a south pole at the upper end of shaft 10' causes the reflector to be repulsed from either position toward the other position. When such pulse terminates, the reflector will then be attracted due to its own permanent magnetism to such other position.

Referring to FIG. 5 there is shown a modified control circuit which may be employed in place of each of the semi-conductor devices D1, D2, D3 and D$n$ of FIG. 2. The circuit in FIG. 5 is provided with a pair of output terminals 18 and 20 which may be connected in place of semi-conductor device D1 for example, terminal 18 being connected to field winding L1 and terminal 20 being connected to the negative side of battery 2. There is also provided a semi-conductor device such as a controlled rectifier CR or the like having an anode A and a cathode C and a control electrode or gate G. Anode A is connected to terminal 18 and cathode C is connected to terminal 20. Gate G is connected through a half-wave rectifier 22 and a secondary winding of a step-down transformer 24 to cathode C. An alternating current power supply source A.C. is connected through a photocell PC across the primary winding of transformer 24.

FIG. 6 shows another modification of the system of FIG. 2. The primary winding of a transformer 26 is connected in the conductor extending from the positive side of battery 2. The secondary winding of transformer 26 is connected to a pulse counter 28 of suitable type. Counter 28 is arranged to operate a relay of solenoid or the like in a known manner, whereby the latter actuates shutter 13 of FIG. 3 to interrupt light beam 12.

The operation of the system will now be described. Let it be assumed that semi-conductor device D1 in FIG. 2 is conducting and that field winding L1 is energized in a circuit extending from the positive side of battery 2 through field winding L1 and semi-conductor device D1 to the negative side of the battery. Semi-conductor devices D1—D$n$ are of a type having a low voltage drop of the order of one volt when conducting in the forward direction. A reverse voltage greater than this and maintained for a few micro-seconds restores such device to a non-conductive state.

The magnetic field developed by field winding L1 causes the rotor A1 to rotate in a clockwise direction to the position shown in FIG. 1 wherein permanent magnet rotor A1 is in alinement with and the north pole N thereof is adjacent field winding L1. The voltage drop across filed winding L1 causes capacitor C1 to charge in a circuit extending from the upper end of field winding L1 through field winding L2 and capacitor C1 to the lower end of winding L1. Rotation of the motor to the position shown in FIG. 1 causes the light beam 1 to be reflected onto semi-conductor device D2 as shown in FIGS. 2 and 3, such light beam having been rotated by reflector 11 from semi-conductor device D1 to semi-conductor device D2. As a result, semi-conductor device D2 is rendered conducting in a circuit extending from the positive side of battery 2 through field winding L2 and semi-conductor device D2 to the negative side of the battery. The initiation of conduction of semi-conductor device D2 establishes a discharge path for capacitor C1 extending through semi-conductor devices D2 and D1. The discharge current from capacitor C1 surges through semi-conductor device D2 and places a momentary reverse potential across semi-conductor device D1 which is substantially equal to the voltage of the source. Such reverse potential causes semi-conductor device D1 to become non-conducting to interrupt the energizing circuit of field winding L1. Rectifier R1 is provided to afford a discharge path for field winding L1 after semi-conductor device D1 has become non-conducting. The aforementioned energization of field winding L2 causes rotor A to rotate 90° in the clockwise direction wherein north pole N of the permanent magnet rotor is adjacent field pole F2. Such rotation of the motor causes light beam 1 to swing from semi-conductor device D2 to semi-conductor device D3 to cause energization of field winding L3 and deenergization of field winding L2 in the manner hereinbefore described. The aforementioned operation is automatically repeated as many times as there are poles in the motor to cause the motor to rotate one revolution and to reoperate in cycles to cause continuous rotation of the motor.

The apparatus shown in FIGS. 1, 2 and 3 affords motor rotation in the clockwise direction. The modification shown in FIG. 4 may be employed to selectively reverse motor rotation. When reflector 11' in FIG. 4 is in the position shown in solid lines, the motor will rotate in the clockwise direction as hereinbefore described. However, when coil 17 is pulsed to pivot reflector 11' to its extreme counterclockwise position, the light beam is reflected 180 degrees in the opposite direction. Assuming that the rotor is in the position shown in FIG. 1, in the latter reflector position, the light beam will be reflected in the left-hand direction and will impinge on semi-conductor device D$n$ to render the same conducting. As a result, field winding L$n$ will be energized and field winding L1 will be deenergized to cause motor rotation in the counterclockwise direction.

Let it be assumed that semi-conductor devices D1, D2, D3 and D$n$ are each replaced by a circuit such as shown in FIG. 5. The photocells PC of these circuits are arranged in a circle so that each time rotor A1 rotates an incremental amount the aforementioned light beam would impinge on the next photocell. The light beam activates photocell PC to complete a circuit from the A.-C. source through the primary winding of stepdown transformer 24. The current flowing out of the secondary winding of the transformer is rectified by rectifier 22 and flows across the cathode and gate electrodes of controlled rectifier CR to render the latter conducting. Conduction of controlled rectifier CR causes energization of the associated motor field winding in the same manner as hereinbefore described in connection with FIG. 2.

The modification shown in FIG. 6 may be employed in the system of FIGS. 2 and 3 with either the semi-conductor devices D1—D$n$ shown in FIG. 2 or with circuits such as shown in FIG. 5. Assuming that the motor is in the position shown in FIG. 1 and that diode D1 is conducting, immediately thereafter diode D2 is rendered conducting and diode D1 is rendered non-conducting to initiate rotation of the motor clockwise. The current flow through the primary winding of transformer 26 transmits a pulse from the secondary winding to counter 28. Let it be assumed that counter 28 is preset to operate shutter 13 of FIG. 3 to block light beam 12 when four pulses have been registered therein. The counter may be arranged to energize a solenoid or the like to operate shutter 13 when such counter counts out in response to the fourth pulse. Energization of field winding L2 causes registration of the first pulse, energization of field winding L3 causes registration of the second pulse, energization of field winding L$n$ causes registration of the third pulse and energization of field winding L1 causes registration of the fourth pulse. Energization of field winding L1 also causes the motor to rotate to the position shown in FIG. 1, thus to complete one revolution. When the fourth pulse is registered, counter 28 operates shutter 13 to cut off the light beam so that diode D2 will not be rendered conductive. If rotor A1 overtravels field pole F1, it will return to the position shown in FIG. 1, or the last energized pole, after less than one-half revolution overtravel. The transformer 26 is provided with an open magnetic core such as a bundle of straight magnetic rods or the like to transmit a pulse to the counter in response to current flow in the primary winding. The primary winding is provided with a low impedance so that the inductive effect thereof is not sufficient to adversely affect the field winding circuits.

While the modification in FIG. 6 has been described in connection with unidirectional rotation of the motor, it will be apparent that it could as well be employed with the reversing structure shown in FIG. 4.

An essential feature of the invention is the provision of novel static commutating controls for a direct current motor having a permanent magnet rotor. The motor can be stopped from full speed at the instant that the shutter is closed and its stopping point is accurately controlled in the event of overtravel. As there is no limit on the power that can be used, such motors could operate the feeds of machine tools directly from tape readers and the like to an accuracy limited only by the errors of lead screws and gearing backlash. Such motors would be useful for many remotely controlled positioners, and combinations thereof would follow all coordinate changes simultaneously. They can also be used as quantizing servos, stepping in either direction in response to integral changes in potentiometer error voltage.

I claim:

1. In a control system for a motor having a rotor and a plurality of stator windings, a power supply source, and static means for commutating electric energy from said source to said windings in a selected order to effect operation of the motor, said static means comprising a plurality of solid element gating devices associated with the respective windings, and radiant energy control means under the control of the motor for rendering said gating devices operative in a predetermined order to effect operation of the motor.

2. In a control system for a motor having a permanent magnet rotor and a plurality of stator windings, a power supply source, and static means for commutating electric energy from said source to said windings in a sequential order to effect rotation of the motor, said static means comprising a plurality of photo-electrically controlled semi-conductor devices with at least one such semi-conductor device in series connection with each stator winding, photo-electric control means for rendering said semi-conductors devices sequentially conducting to energize said stator windings in a corresponding order thereby to effect rotation of the motor, and means responsive to motor rotation for controlling said photoelectric control means to cause the latter to render said semi-conductor devices conducting in sequence.

3. In a control system for a motor having a magnetic rotor and a plurality of stator windings, a power supply source, and static means for commutating electric energy from said source to said windings in a selectively predetermined order to effect operation of the motor, said static means comprising a plurality of gating devices associated with the respective windings, said gating devices being responsive to radiant energy, radiant energy control means for rendering said gating devices active in a selected sequence to effect operation of the motor, and means responsive to activation of each gating device for rendering inactive the gating device preceding each such active gating device in the operating sequence.

4. The invention defined in claim 3, wherein the last mentioned means comprises electrical energy storage means associated with each stator winding and each being effective to store electrical energy concurrently with the energization of the associated stator winding, each said storage means being effective to discharge said stored electrical energy in response to activation of the gating device associated with the succeeding stator winding in said sequence to apply a reverse potential on and to inactivate the active gating device associated with the preceding stator winding in said sequence.

5. The invention defined in claim 4, together with a unidirectional conducting device associated with each stator winding for discharging the latter in response to interruption of its energizing circuit when the associated gating device is inactivated.

6. In a commutating control system for a motor having a magnetic rotor and a plurality of stator windings, a power supply source, and means for commutating electric energy from said source to said windings in a controllable order to effect operation of the motor, said means comprising a plurality of semi-conductor devices connected to said source with at least one such device in circuit with each stator winding for controlling energization and deenergization of the latter, and radiant energy control means for controlling said devices, said radiant energy control means comprising means responsive to motor rotation for rendering said devices operative in sequence to effect operation of the motor in a predetermined direction.

7. The invention defined in claim 6, wherein said means responsive to motor rotation comprises further means responsive to an electrical signal for reversing the sequence in which said devices are rendered operative to reverse the motor rotation.

8. The invention defined in claim 6, together with means for controlling stopping of the motor when it has rotated a predetermined angular amount comprising means for deriving an electrical pulse in response to each energization of a stator winding, means for registering said pulses, and means responsive to registration of a predetermined number of said pulses for rendering said radiant energy control means ineffective whereby said rotor stops in registration with the last energized stator winding.

9. The invention defined in claim 6, wherein said plurality of semi-conductor devices comprise a plurality of light responsive semi-conductor diodes arranged in a circle, and said radiant energy control means comprises a light source, and a reflector operable by the motor in response to an incremental rotation of the latter into registration with a given stator winding for reflecting the light onto the semi-conductor diode in circuit with the next stator winding in the sequence.

10. The invention defined in claim 6, wherein said plurality of semi-conductor devices comprise a plurality of controllable semi-conductor devices, and said radiant energy control means comprises a plurality of photo-cells arranged in a circle, an electrical source, means connecting said electrical source and one of said photo-cells to the control electrode of each said semi-conductor device to render the latter conducting when the corresponding photo-cell is activated, a light source, and a reflector operable by the motor concurrently with an incremental rotation of the latter into alinement with a given stator winding for swinging said light beam to impinge on the photo-cell associated with the next stator winding in the sequence.

11. In a commutating control system for a motor having a magnetic rotor mounted on a shaft and a plurality of stator windings, a direct current power supply source, and means for commutating electric energy from said source to said windings in a controllable sequence to effect reverse operation of the motor, said means comprising a plurality of photo-electrically controlled devices with at least one such device for each stator winding for controlling energization and deenergization of the latter, a light source, a reflector pivotally mounted on one end of the motor shaft and having two angularly spaced operative positions, said reflector being effective in a first operating position when the rotor rotates into registration with a given stator winding to reflect the light radiating from said light source on the photo-electric devices associated with the next stator winding in the clockwise direction, and a stationary coil surrounding the motor shaft adjacent said reflector and being operative in response to a unidirectional electrical pulse to pivot said reflector to the second operating position, said reflector being effective in said second operating position when the rotor rotates into registration with said given stator winding to reflect said light on the photo-electric device associated with the next stator winding in the counterclockwise direction.

12. The invention defined in claim 11, wherein said plurality of photo-electrically controlled devices comprise a plurality of semi-conductor devices with at least one such device in series connection with each stator winding for controlling completion and interruption of an energizing circuit from said source to the associated stator winding, each series-connected semi-conductor device and stator winding being connected across said source, and a plurality of capacitors with at least one such capacitor connected between the junction of each semi-conductor device and stator winding and the junction of the adjacent semi-conductor device and stator winding, each said capacitor being effective to charge in response to energization of the preceding stator winding in said sequence and being effective to discharge in response to completion of the energizing circuit of the next stator winding in said sequence, said capacitor discharge applying a reverse potential on the semi-conductor device connected to said preceding stator winding to interrupt the energizing circuit of the latter.

13. The invention defined in claim 12, together with a unidirectional conducting device connected across each stator winding forming a low impedance discharge path for the latter when the energizing circuit of such stator winding is interrupted, said unidirectional device being poled to block current flow therethrough from said source in shunt of said stator winding.

14. In a static commutating control system for a motor having a permanent magnet rotor and a plurality of stator windings, an electrical power supply source, static means for controlling operation of the motor comprising a plurality of radiant energy responsive control devices for controlling energization of the respective windings, radiant energy means, commutating means operable by the motor for controlling said radiant energy control means, said commutating means being effective when the rotor is at a predetermined angle to cause energization of one of said windings to initiate rotation of the motor, and said commutating means being responsive to motor rotation for causing energization of said windings in sequence thereby to continue rotation of the motor.

References Cited in the file of this patent

UNITED STATES PATENTS

| | | |
|---|---|---|
| 2,370,000 | Best | Feb. 20, 1945 |
| 2,810,843 | Granqvist | Oct. 22, 1957 |
| 2,919,358 | Marrison | Dec. 29, 1958 |